(12) United States Patent
Yazici et al.

(10) Patent No.: US 12,716,389 B2
(45) Date of Patent: Aug. 25, 2026

(54) GAS TURBINE ENGINE BUFFER AIR AUGMENTATION SYSTEM AND METHOD

(71) Applicant: RTX Corporation, Farmington, CT (US)

(72) Inventors: Murat Yazici, Glastonbury, CT (US); Andrew E. Breault, Bolton, CT (US)

(73) Assignee: RTX Corporation, Farmington, CT (US)

( * ) Notice: Subject to any disclaimer, the term of this patent is extended or adjusted under 35 U.S.C. 154(b) by 104 days.

(21) Appl. No.: 18/762,328

(22) Filed: Jul. 2, 2024

(65) Prior Publication Data

US 2026/0009361 A1 Jan. 8, 2026

(51) Int. Cl.
*F02C 7/277* (2006.01)
*F02C 7/06* (2006.01)

(52) U.S. Cl.
CPC ................ *F02C 7/277* (2013.01); *F02C 7/06* (2013.01)

(58) Field of Classification Search
CPC ...... F02C 7/06; F02C 7/08; F02C 7/28; F02C 7/277; F01D 25/18; F01D 25/125; F01D 25/183
See application file for complete search history.

(56) References Cited

U.S. PATENT DOCUMENTS 6,623,238 B2 9/2003 Langston
9,429,037 B2 * 8/2016 Milne .................. F01D 25/183
10,138,812 B2 * 11/2018 Heaton ................ F16C 33/762
10,502,135 B2 * 12/2019 Ackermann ........... F02C 7/141
10,731,563 B2 8/2020 Munsell
11,391,219 B2 * 7/2022 Smith ................ F04D 27/0223
11,486,314 B2 11/2022 Suciu
11,499,479 B2 11/2022 Gould
11,905,841 B1 2/2024 Glahn
2007/0107438 A1 * 5/2007 Morimoto .............. F01D 11/06 60/785
2009/0288384 A1 * 11/2009 Granitz ..................... F02C 3/04 60/39.08
2013/0174574 A1 7/2013 Heaton
2013/0192250 A1 * 8/2013 Glahn ....................... F02C 6/08 60/785
2014/0096533 A1 4/2014 Homeyer
2018/0128319 A1 * 5/2018 Duffy ........................ F02C 7/06
2022/0162993 A1 5/2022 Sawyers-Abbott

OTHER PUBLICATIONS

EP search report for EP25187067.1 dated Nov. 20, 2025.

* cited by examiner

*Primary Examiner* — David P. Olynick
(74) *Attorney, Agent, or Firm* — Getz Balich LLC

(57) ABSTRACT

A gas turbine engine is provided that includes compressor and turbine sections, an engine compartment, an air turbine starter (ATS), and a buffer air augmentation system. The compressor and turbine sections are engaged by a shaft. The ATS is disposed to drive the compressor and turbine sections. The air turbine starter is configured to receive a flow of compressed air from a compressed air source. The air turbine starter has an exhaust port configured to pass a flow of ATS exhaust gas flow. The buffer air augmentation system includes flow ducting configured to selectively provide fluid communication of the flow of ATS exhaust gas between the exhaust port of the air turbine starter and the engine compartment. The system is configured to provide the flow of ATS exhaust gas to the engine compartment during a start-up segment of an engine operational cycle.

13 Claims, 4 Drawing Sheets

GAS TURBINE ENGINE BUFFER AIR AUGMENTATION SYSTEM AND METHOD

BACKGROUND OF THE INVENTION

1. Technical Field

The present disclosure relates to gas turbine engines in general and to systems for providing buffer air to gas turbine engine components in particular.

2. Background Information

In many aircraft powered by a gas turbine engine, air bled from the compressor section of the engine is provided to ventilate the aircraft cabin. Air bled from the compressor section is also often used to pressurize compartments within the gas turbine engine; i.e., "buffer air" pressurization. The pressurization is utilized to direct or maintain engine oil where desired within a compartment. In the absence of adequate pressurization, air contaminated with engine oil can mix with compressor bleed air that is provided to the aircraft cabin for ventilation. Producing compressor bleed air at the pressure and flow necessary to both pressurize compartments and ventilate the aircraft cabin can be challenging during engine start-up when compressor rotor speeds are below idle. It would be beneficial to have a system that pressurizes engine compartments during start-up in a manner that avoids contamination of cabin ventilation air.

Gas turbine engines may be started, for example, using an electrically powered starter or an air turbine starter. The starter is utilized to rotate the engine core up to a speed that provides enough airflow through the engine for fuel to be ignited. The starter thereafter helps the engine accelerate to a self-sustaining speed. Electrically powered starters require an electrical energy source and tend to be appreciably heavier than air turbine starters. Air turbine starters are driven by a source of pressurized air; e.g., pressurized air from a ground-operated air cart, or an auxiliary power unit (APU), or the like.

SUMMARY

According to an aspect of the present disclosure, a gas turbine engine is provided that includes a compressor section, a turbine section, an engine compartment, an air turbine starter (ATS), and a buffer air augmentation system. The turbine section is engaged with the compressor section by a shaft. The ATS is disposed to drive the compressor section and a turbine section. The air turbine starter is configured to receive a flow of compressed air from a compressed air source. The air turbine starter has an exhaust port configured to pass a flow of ATS exhaust gas flow. The buffer air augmentation system includes flow ducting configured to selectively provide fluid communication of the flow of ATS exhaust gas between the exhaust port of the air turbine starter and the engine compartment. The system is configured to provide the flow of ATS exhaust gas to the engine compartment during a start-up segment of an engine operational cycle.

In any of the aspects or embodiments described above and herein, the gas turbine engine may include a bearing within a bearing compartment. The bearing supports the shaft. The engine compartment is contiguous with the bearing compartment. A seal is disposed to seal fluid flow between the bearing compartment and the engine compartment.

In any of the aspects or embodiments described above and herein, the flow ducting may include a fluid flow control device configured to control the flow of ATS exhaust gas between the exhaust port of the air turbine starter and the engine compartment.

In any of the aspects or embodiments described above and herein, the buffer air augmentation system may be in communication with a controller, and the controller may be in communication with the fluid flow control device and a non-transitory memory storing instructions. The instructions when executed may cause the controller to control the fluid flow control device to control the flow of ATS exhaust gas between the exhaust port of the air turbine starter and the engine compartment until air within the engine compartment is at or above a predetermined air pressure value.

In any of the aspects or embodiments described above and herein, the fluid flow device may be a controllable valve.

In any of the aspects or embodiments described above and herein, the controller may use stored data to control the fluid flow control device.

In any of the aspects or embodiments described above and herein, the buffer air augmentation system may include a sensor configured to sense air pressure within the engine compartment or the bearing compartment and may produce sensor signals representative of the air pressure within the engine compartment or the bearing compartment, and the controller may use the sensor signals to control the fluid flow device.

In any of the aspects or embodiments described above and herein, the buffer air augmentation system may include a one way valve in communication with the flow ducting, the valve configured to allow the flow of ATS exhaust gas from the exhaust port of the air turbine starter to the engine compartment.

According to an aspect of the present disclosure, a method of providing buffer air to an engine compartment of a gas turbine engine, wherein the gas turbine engine includes a compressor section and a turbine section, wherein the turbine section is engaged with the compressor section by a shaft, and the shaft is supported by a bearing disposed within a bearing compartment. The method includes: providing a flow of compressor bleed air to an engine compartment, the compressor bleed air provided from the compressor section; providing a flow of compressed air from a compressed air source to an air turbine starter (ATS), wherein the flow of compressed air drives the air turbine starter and the driven air turbine starter drives the compressor section and the turbine section during a start-up segment of an engine operational cycle of the gas turbine engine, wherein the flow of compressed air exits the air turbine starter as a flow of ATS exhaust gas through an exhaust port of the air turbine starter; and controlling the flow of ATS exhaust gas into the engine compartment during the start-up segment of an engine operational cycle of the gas turbine engine.

In any of the aspects or embodiments described above and herein, the engine compartment may be contiguous with the bearing compartment, and a seal may be disposed to seal fluid flow between the bearing compartment and the engine compartment.

In any of the aspects or embodiments described above and herein, the method may include providing a flow of engine oil to the bearing compartment and the step of controlling the flow of ATS exhaust gas into the engine compartment may include maintaining a pressure difference across the seal. The pressure difference is the difference between a first air pressure within the engine compartment and a second air pressure present within the bearing compartment. The first air pressure may be greater than the second air pressure.

In any of the aspects or embodiments described above and herein, the step of controlling the flow of ATS exhaust gas into the engine compartment may include using a fluid flow control device configured to control the flow of ATS exhaust gas between the exhaust port of the air turbine starter and the engine compartment.

In any of the aspects or embodiments described above and herein, the pressure difference may be maintained at a magnitude that inhibits passage of the engine oil across the seal.

In any of the aspects or embodiments described above and herein, the fluid flow control device may be controllable.

In any of the aspects or embodiments described above and herein, data stored in a non-transitory memory may be used to control the fluid flow control device.

In any of the aspects or embodiments described above and herein, the fluid flow control device may be a passive one-way valve.

In any of the aspects or embodiments described above and herein, the step of controlling the flow of ATS exhaust gas into the engine compartment may include adjusting the flow of ATS exhaust gas into the engine compartment based on the flow of compressor bleed air to the engine compartment.

According to an aspect of the present disclosure, a buffer air augmentation system for a gas turbine engine is provided. The gas turbine engine has a compressor section and a turbine section engaged with one another by at least one shaft, a plurality of bearings supporting the shaft, and an engine compartment. The system includes an air turbine starter (ATS) and flow ducting. The ATS is disposed to drive the compressor section and a turbine section, and is configured to receive a flow of compressed air from a compressed air source. The ATS has an exhaust port through which a flow of ATS exhaust gas exits the air turbine starter. The flow ducting is configured to selectively provide fluid communication between the exhaust port of the air turbine starter and the engine compartment.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
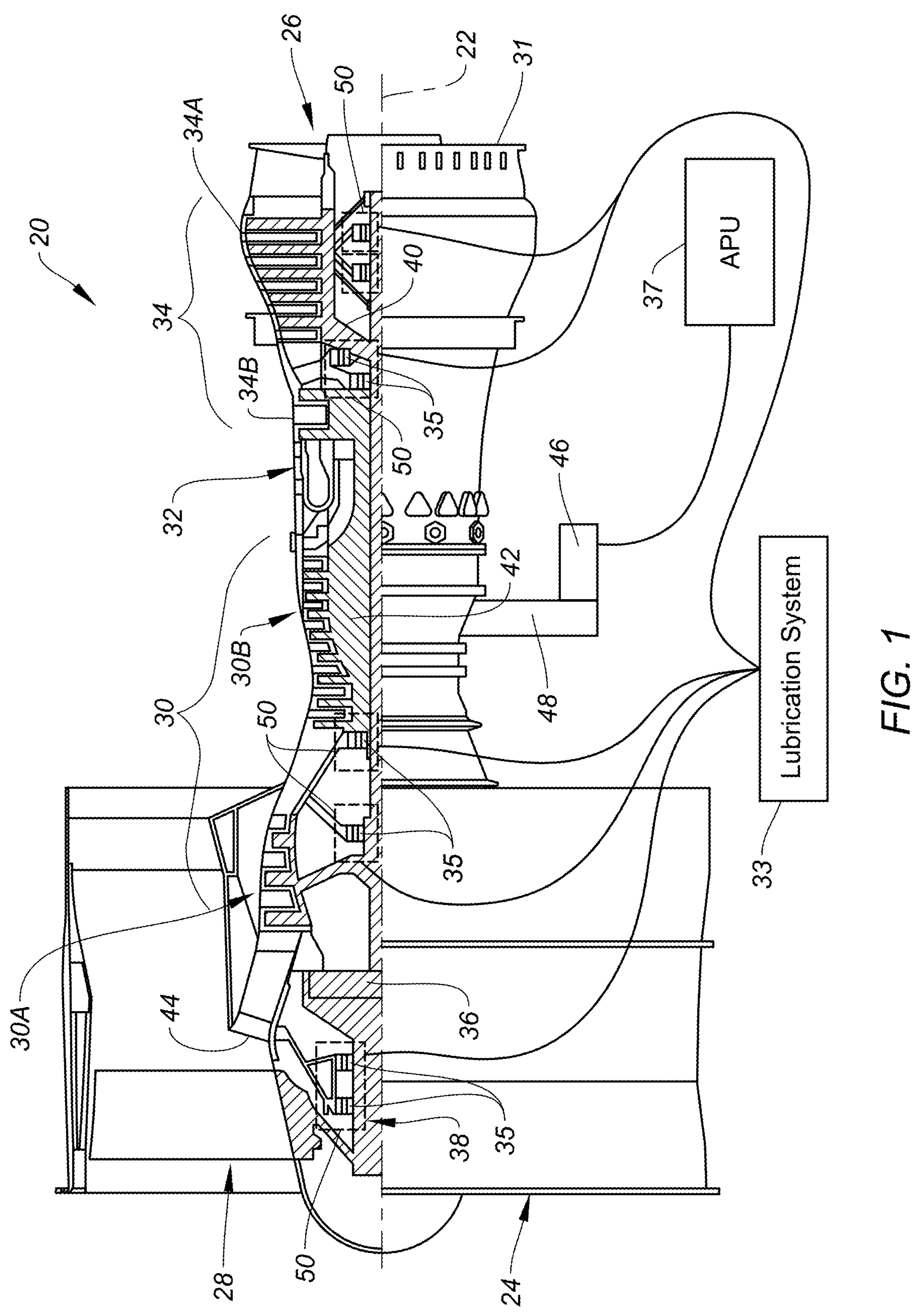
FIG. 1 is a diagrammatic sectional view of a gas turbine engine embodiment.

FIG. 1 shows a partially sectioned diagrammatic view of a geared gas turbine engine 20. The gas turbine engine 20 extends along an axial centerline 22 between an upstream airflow inlet 24 and a downstream airflow exhaust 26. The gas turbine engine 20 includes a fan section 28, a compressor section 30, a combustor section 32, and a turbine section 34. The compressor section 30 includes a low-pressure compressor 30A (LPC) and a high-pressure compressor 30B (HPC). The turbine section 34 includes a high-pressure turbine 34A (HPT) and a low-pressure turbine 34B (LPT). Bearings 35 are used to support the shafts. The engine sections 28, 30, 32, 34 are arranged sequentially along the centerline 22. The fan section 28 may be connected to a geared architecture 36, for example, through a fan shaft 38. The geared architecture 36 and the LPC 30A are connected to and driven by the LPT 34 through a low-speed shaft 40. The HPC 30B is connected to and driven by the HPT 34B through a high-speed shaft 42. Air entering the engine 20 through the airflow inlet 24 is worked by the fan section 28. Air worked by the fan section 28 enters a compressor inlet, subsequently entering the compressor section 30. The compressor section 30 adds additional work to the air passing through the compressor section 30, increasing the pressure and temperature of the air. The compressed air subsequently enters the combustor section 32 where it is mixed with fuel and ignited. The combustion products and any air not used in the combustion process (collectively referred to as "core gas") enters and power the turbine section 34. The core gas subsequently exits the engine 20 and passes to the atmosphere via an exhaust section 31. The path of the air through the compressor section 30, the combustor section 32, and the turbine section 34 may be referred to as the core gas path. The gas turbine engine 20 further includes a lubrication system 33 that provides a lubricant (e.g., "engine oil") to various engine components (e.g., bearings 35, gearboxes 48, and the like) for lubrication purposes and often for cooling purposes as well. The lubrication system 33 typically includes an oil pump, a air/oil separator, an oil tank, a scavenge pump, a heat exchanger, supply conduits, return conduits, and other components. FIG. 1 diagrammatically illustrates the lubrication system 33 in fluid communication with bearing compartments 50 (diagrammatically shown in dashed lines) containing the bearings 35 and with the gearbox 48. The present disclosure is not limited to any particular lubrication system 33 configuration. FIG. 1 also diagrammatically illustrates the gas turbine engine 20 is communication with an auxiliary power unit 37 (APU) that may be included with an aircraft. As will be detailed herein, in some present disclosure embodiments compressed air/core gas produced by the APU may be provided to an air turbine starter 46 (ATS).

The terms "forward", "leading", "aft, "trailing" are used herein to indicate the relative position of a component or surface. As air passes through the engine 20, a "leading edge" of a stator vane or rotor blade encounters the air before the "trailing edge" of the same. In a conventional axial engine 20 such as that shown in FIG. 1, the fan section 28 is "forward" of the compressor section 30 and the turbine section 34 is "aft" of the compressor section 30. The terms "inner radial" and "outer radial" refer to relative radial positions from the engine centerline 22. An inner radial component or path is disposed radially closer to the engine centerline 22 than an outer radial component or path.

The gas turbine engine 20 diagrammatically shown in FIG. 1 is an example provided to facilitate the description herein. The present disclosure is not limited to any particular gas turbine engine configuration having a bypass air configuration, including the two-spool engine configuration shown, and may be utilized with single spool gas turbine engines as well as three spool gas turbine engines and the like.

Figure 2:
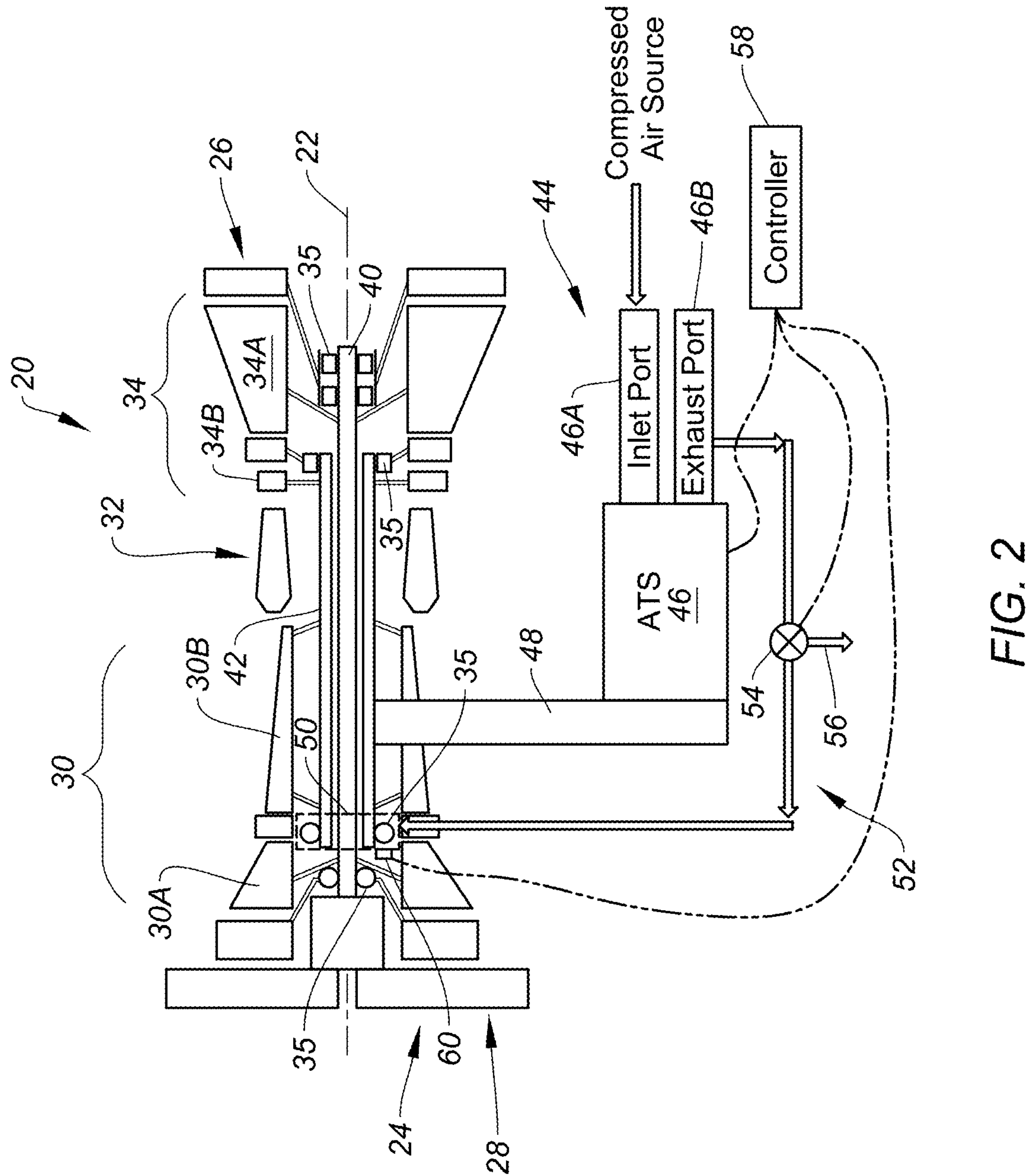
FIG. 2 is a diagrammatic sectional view of a gas turbine engine embodiment, illustrating an embodiment of the present disclosure.

Referring to FIG. 2, the present disclosure is directed to a buffer air augmentation system 44 for use with a gas turbine engine 20. The system 44 is in communication with an air turbine starter 46 (ATS) that is engaged with an engine gearbox 48. The engine gearbox 48, in turn, is in communication with the gas turbine engine 20. The engine gearbox 48 may be in communication with the low-speed shaft 40 or the high-speed shaft 42 of the engine 20, or both; e.g., via a tower shaft (not shown). The present disclosure is not limited to any particular mechanical engagement system between the gearbox 48 and the engine 20, other than the gearbox 48 may be utilized to selectively drive the engine 20; e.g., during start-up. The engine gearbox 48 is in communication with an ATS 46. The present disclosure is not limited to any particular ATS 46 configuration. An ATS 46 typically includes one or more rotor disks (not shown) that are driven by compressed air from a compressed air source. The ATS rotor disks in turn drive an ATS reduction gearbox (not shown); e.g., a planetary gear drive that has an output shaft (not shown). The ATS output shaft is mechanically engaged with an input shaft of the engine gearbox 48. The ATS 46 includes an air inlet port 46A and an air exhaust port 46B. The air inlet port 46A is configured to receive a flow of compressed air from a source of compressed air; e.g., an auxiliary power unit (APU), a ground-operated air cart, or the like. The compressed air flow introduced into the ATS 46 via the air inlet port 46A drives the ATS rotor disks causing them to rotate. The compressed air subsequently exits the ATS 46 through the ATS air exhaust port 46B as "ATS exhaust gas flow". In conventional applications, the ATS exhaust gas flow is exhausted to the atmosphere. Although the compressed air has performed some work within the ATS 46 and therefore has expended some energy before exiting the ATS 46, the ATS exhaust gas flow is still at an elevated pressure relative to ambient conditions.

The present disclosure buffer air augmentation system 44 is configured to selectively direct ATS exhaust gas flow relative to one or more engine compartments within a gas turbine engine 20 during certain segments of engine 20 operation as will be described herein. To facilitate the description herein, the buffer air augmentation system 44 will be described for use with a bearing compartment 50. The present disclosure is not, however, limited to use with a bearing compartment. In addition, the present disclosure buffer air augmentation system 44 is described herein in a configuration that provides ATS exhaust gas flow relative to a single bearing compartment 50 to facilitate the description herein. The present disclosure buffer air augmentation system 44 is not, however, limited to operating with a single bearing compartment 50. Within the present disclosure system, ATS exhaust gas flow may be directed relative to the bearing compartment 50 through flow ducting 52. The flow ducting 52 may include tubing or any other fluid conduit as well as fluid control devices 54 such as pressure control devices, heat transfer devices, controllable valving, and the like, that are capable of containing the ATS exhaust gas flow in the gas turbine engine 20 operating environment. The diagrammatic system representation shown in FIG. 2 illustrates flow ducting 52 that includes tubing and a controllable valve 54. The valve 54 may be controlled to an open configuration that allows passage of ATS exhaust gas flow through the valve 54 and to the engine compartment 50 or to a closed configuration that prevents fluid passage through the valve 54. In the closed configuration, the valve 54 may prevent air passage from the ATS 46 to the engine compartment 50, or conversely prevent air (which may be contaminated with oil) passage from the engine compartment 50 towards the ATS 46 or elsewhere. In an open configuration, the valve 54 may be controlled to be fully open (i.e., maximum permissible fluid flow through the valve 54), or partially open (i.e., less than maximum permissible fluid flow through the valve 54). The controllable valve 54 embodiment in FIG. 2 includes a secondary duct 56 that allows ATS exhaust gas flow to be directed away from the engine compartment 50; e.g., directed to the atmosphere (or elsewhere) in the event the ATS 46 is operating and producing an ATS exhaust gas flow, and that flow is not required for buffering within the engine compartment 50. In those embodiments that include a controllable valve 54 in communication with a secondary duct 56, the system 44 may accomplish the described flow control with a single valve or more than one valve.

In some embodiments, the present disclosure buffer air augmentation system 44 may include a passive one-way valve rather than a controllable valve. The passive one way valve would allow passage of ATS exhaust flow to the engine compartment 50 and would prevent fluid passage from the engine compartment 50 towards the ATS 46.

In some embodiments, the present disclosure buffer air augmentation system 44 may include a controller 58 configured to control and/or receive signals from whatever system components (e.g., the ATS 46, flow ducting 52 components such as a valve 54, or the like) are used to perform the functions described herein. The controller 58 may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the system 44 to accomplish the same algorithmically and/or coordination of system components. The controller 58 includes or is in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. Communications between the controller 58 and other system components may be via a hardwire connection or via a wireless connection.

In some embodiments, the present disclosure buffer air augmentation system 44 may include one or more sensors 60 (e.g., a pressure sensor) in communication with the bearing compartment 50. The sensor 60 is configured to sense a fluid parameter (e.g., air pressure) and provide a sensor signal to the controller 58 representative of the sensed fluid parameter.

Figure 3:
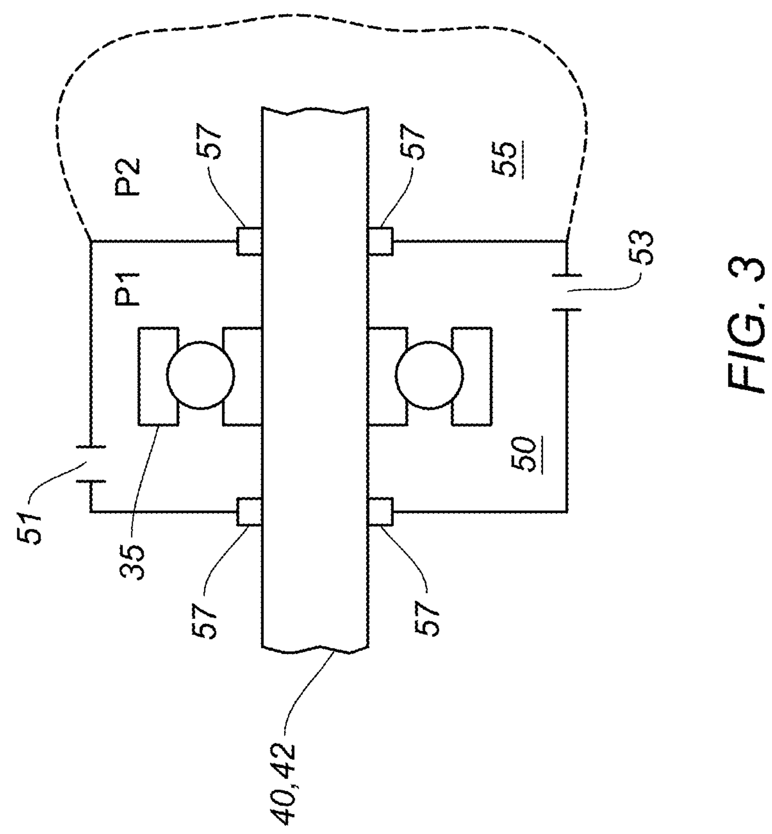
FIG. 3 is a diagrammatic representation of a bearing compartment disposed relative to a shaft.

Referring to FIGS. 2 and 3, the gas turbine engine 20 is configured to operate during an operational cycle. The operational cycle includes start-up segment, a run segment, and a shut-down segment. The start-up segment extends between the gas turbine engine 20 being in a non-rotational state; i.e., the rotors within the compressor and turbine sections 30, 34 are stationary and there is no core gas flow through the engine 20. During the start-up segment, the compressor and turbine sections 30, 34 of the engine 20 are rotated. At the same time, the lubrication system 33 is controlled to provide engine oil to the bearing compartments 50. As the compressor and turbine section 30, 34 rotors begin to rotate, a core gas flow is driven through the core gas path of the engine 20. At this point, the pressure of the core gas flow is below that which is present when the engine 20 is in an idle state. Also at this point, air is bled off of a compressor section 30 (e.g., a stage of the LPC or the HPC) and is provided for the purpose of creating a pressure difference across one or more seals 57 that maintain the engine oil within the bearing compartment 50. FIG. 3 is a diagrammatic representation of a bearing compartment 50 disposed relative to a shaft 40, 42. The bearing compartment 50 has an inlet 51 that receives engine oil from the lubrication system 33 and has a drain 53 that allows engine oil to exit the bearing compartment 50 for scavenging back to other components within the lubrication system 33. A compartment 55 contiguous with and external to the bearing compartment 50 is shown diagrammatically by dashed line. Seals 57 are shown at the interface between the bearing compartment 50 and the shaft 40, 42. The pressure difference across the seals 57 is represented by a first pressure within the bearing compartment 50 (P1) and a second pressure in the external compartment 55 (P2). For some portion of the engine 20 start-up segment, the pressure of the compressor bleed air (i.e., the air at P2 within the external compartment 55) will likely be insufficient to create the desired pressure difference across the bearing compartment 50 seals; i.e., P2≤P1. When the pressure difference across the seal is inadequate, oil leakage may occur across the seals 57 and that oil leakage may contaminate the air within the external compartment The present disclosure buffer air augmentation system 44 provides a means to provide adequate engine compartment 50 buffering during an engine operational start-up segment. As indicated above, an ATS 46 is used as the starter motor to initially drive the gearbox 48 which in turn drives the engine shafts 40, 42. The ATS 46 is connected to a source of pressurized air; e.g., pressurized air from a ground-operated air cart, or an auxiliary power unit (APU), or the like. A pressurized air flow from the air source is provided to the ATS 46 to drive the ATS output shaft which is engaged with the gearbox 48. The gearbox 48, in turn, begins to rotate the compressor and turbine sections 30, 34 of the engine 20. The now rotating compressor and turbine sections 30, 34 produce some amount of core gas flow, a portion of which is bled off of the compressor section 30 and is directed to the compartment 55 external to the bearing compartment 50.

The present disclosure buffer air augmentation system 44 receives the ATS exhaust gas flow from the ATS 46 and directs at least some of the ATS exhaust gas flow to the external compartment 55 via the flow ducting 52 to augment the flow of compressor bleed air provided to the external compartment 55. In some embodiments, fluid control device 54 components of the flow ducting 52 may be controlled (e.g., via stored instructions executed by the controller 58) to provide whatever amount of ATS exhaust gas flow is appropriate to the external compartment 55 for buffering purposes; i.e., to create a pressure differential. The fluid control device 54 components of the flow ducting 52 may also be utilized to control parameters (e.g., pressure, flow rate, temperature, or the like) of the ATS exhaust gas flow for buffering purposes.

Figure 4:
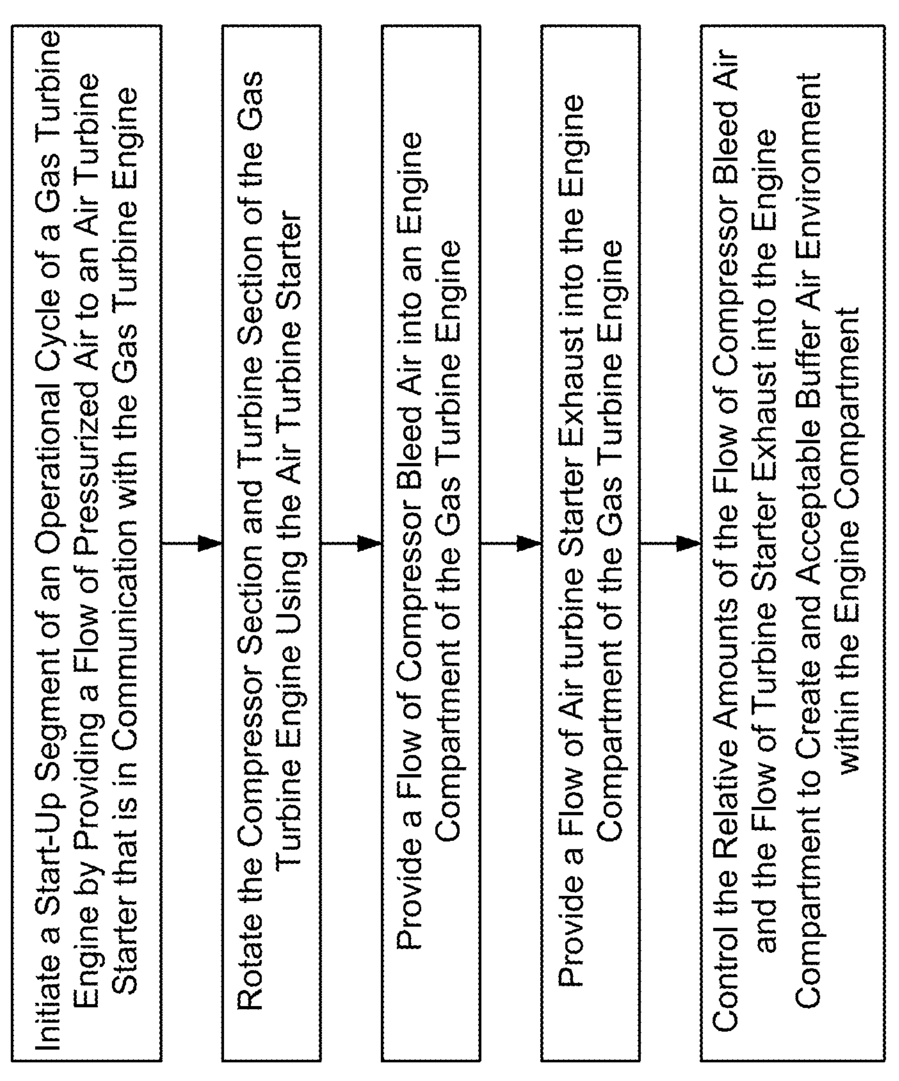
FIG. 4 is a flow chart representative of an embodiment of the present disclosure.

During the start-up segment, the gas turbine engine 20 transitions from a non-operational state (compressor and turbine sections 30, 34 not rotating; no core gas flow) to an operational state wherein the engine 20 is self-sustaining; e.g., fuel is combusted within the combustor section 32 and the turbine section 34 is driven, and the turbine section 34 drives the compressor section 30. In the transition from the non-operational state to the self-sustaining operational state, the rotational speeds of the compressor section 30 and the turbine section 34 increase as well as the pressure and temperature of the core gas flow within the compressor and turbine sections 30, 34. Hence, parameters of the flow of compressor bleed air used for buffering purposes vary during the transition from the non-operational state to the self-sustaining operational state. The present disclosure buffer air augmentation system 44 is controllable to provide an appropriate amount of ATS exhaust gas flow for buffering purposes throughout the transition period. As the gas turbine engine 20 approaches a self-sustaining operational state and is capable of providing an amount of compressor bleed air at a pressure to provide the desired level of buffering, the present disclosure buffer air augmentation system 44 may be controlled (e.g., via stored instructions executed by the controller 58) to taper the buffering augmentation until no buffering augmentation is required. The present disclosure buffer air augmentation system 44 may use data (e.g., parameter tables, algorithmic logic, or the like) stored within a memory device that is accessible by the controller 58, or sensor signals from sensors 60, or the like, or any combination thereof to control the buffer air augmentation system 44 to achieve the desired level of buffering relative to the bearing compartment 50. The flow chart of FIG. 4 illustrates an example of the present disclosure methodology.

Some embodiments of the present disclosure may be configured such that the amount of ATS exhaust gas flow produced by the ATS 46 that is not used for buffering purposes as described herein is diverted from the engine compartment 50. The diverted amount of ATS exhaust gas flow may be released to the atmosphere or may be utilized elsewhere within the gas turbine engine 20 and/or the aircraft. As indicated herein, the present disclosure buffer air augmentation system 44 may be controlled to taper the ATS exhaust gas flow used for buffering augmentation from an initial amount to a point where no ATS exhaust gas flow is used for buffering augmentation. Hence, the diverted amount of ATS exhaust gas flow may transition from an initial amount (which could be zero) to a final amount which could be one hundred percent (100%) of the ATS exhaust gas flow.

The present disclosure buffer air augmentation system 44 is also understood to provide benefit in instances when a gas turbine engine 20 may be susceptible to engine rotor bowing. When a gas turbine engine 20 is shut down it typically develops a circumferential thermal gradient vertically across the compressor section 30 due to hot air rising from the cooling metal components and pooling at the top. As the hot compressor rotor drum and casing cool and contract in the presence of this thermal gradient, they do so non-uniformly and therefore will bend slightly, in a phenomenon known as rotor bow. Starting an engine 20 under bowed conditions can be problematic. An appropriate amount of engine oil within a bearing compartment can function to not only provide lubrication to the bearings 35 but also to dampen rotational deviations of a rotor shaft attributable to rotor bow. The present disclosure buffer air augmentation system 44 facilitates maintaining the appropriate amount of engine oil in the desired portions of the bearing compartment during start-up. As a result, the engine oil appropriately disposed within the bearing compartment can provide a damping function until the thermal gradient that created the rotor bow condition no longer exists, and thereby mitigate undesirable effects associated with a rotor bow condition.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible.

The invention claimed is:

1. A gas turbine engine, comprising:

a compressor section;

a turbine section, wherein the turbine section is engaged with the compressor section by a shaft;

an engine compartment;

an air turbine starter (ATS) disposed to drive the compressor section and a turbine section, the air turbine starter configured to receive a flow of compressed air from a compressed air source, and the air turbine starter having an exhaust port configured to pass a flow of ATS exhaust gas; and a buffer air augmentation system that includes flow ducting and a fluid flow control device configured to selectively provide fluid communication of the flow of ATS exhaust gas between the exhaust port of the air turbine starter and the engine compartment;

wherein the system is configured to provide the flow of ATS exhaust gas to the engine compartment during a start-up segment of an engine operational cycle; and wherein the buffer air augmentation system is in communication with a controller, and the controller is in communication with the fluid flow control device and a non-transitory memory storing instructions, which instructions when executed cause the controller to control the fluid flow control device to control the flow of ATS exhaust gas between the exhaust port of the air turbine starter and the engine compartment until air within the engine compartment is at or above a predetermined air pressure value.

2. The gas turbine engine of claim 1, further comprising a bearing within a bearing compartment, the bearing supporting the shaft, wherein the engine compartment is contiguous with the bearing compartment, and a seal is disposed to seal fluid flow between the bearing compartment and the engine compartment.

3. The gas turbine engine of claim 1, wherein the fluid flow device is a controllable valve.

4. The gas turbine engine of claim 1, wherein the controller uses stored data to control the fluid flow control device.

5. The gas turbine engine of claim 2, wherein the buffer air augmentation system includes a sensor configured to sense air pressure within the engine compartment or the bearing compartment and produce sensor signals representative of the air pressure within the engine compartment or the bearing compartment, and the controller uses the sensor signals to control the fluid flow device.

6. The gas turbine engine of claim 1, wherein the buffer air augmentation system includes a one way valve in communication with the flow ducting configured to allow the flow of ATS exhaust gas from the exhaust port of the air turbine starter to the engine compartment.

7. A method of providing buffer air to an engine compartment of a gas turbine engine, wherein the gas turbine engine includes a compressor section and a turbine section, wherein the turbine section is engaged with the compressor section by a shaft, and the shaft is supported by a bearing disposed within a bearing compartment, the method comprising:

providing a flow of compressor bleed air to an engine compartment, the compressor bleed air provided from the compressor section;

providing a flow of compressed air from a compressed air source to an air turbine starter (ATS), wherein the flow of compressed air drives the air turbine starter and the driven air turbine starter drives the compressor section and the turbine section during a start-up segment of an engine operational cycle of the gas turbine engine, wherein the flow of compressed air exits the air turbine starter as a flow of ATS exhaust gas through an exhaust port of the air turbine starter; and controlling the flow of ATS exhaust gas into the engine compartment during the start-up segment of an engine operational cycle of the gas turbine engine using a fluid flow control device in communication with a controller, the controller configured to control the flow of ATS exhaust gas between the exhaust port of the air turbine starter and the engine compartment through the fluid control device until air from the compressor bleed source is at or above a predetermined air pressure value.

8. The method of claim 7, wherein the engine compartment is contiguous with the bearing compartment, and a seal is disposed to seal fluid flow between the bearing compartment and the engine compartment.

9. The method of claim 8, further comprising providing a flow of engine oil to the bearing compartment and wherein the step of controlling the flow of ATS exhaust gas into the engine compartment includes maintaining a pressure difference across the seal, wherein the pressure difference is the difference between a first air pressure within the engine compartment and a second air pressure present within the bearing compartment, and the first air pressure is greater than the second air pressure.

10. The method of claim 9, wherein the pressure difference is maintained at a magnitude that inhibits passage of the engine oil across the seal.

11. The method of claim 9, wherein data stored in a non-transitory memory is used to control the fluid flow control device.

12. The method of claim 7, wherein the step of controlling the flow of ATS exhaust gas into the engine compartment includes adjusting the flow of ATS exhaust gas into the engine compartment based on the flow of compressor bleed air to the engine compartment.

13. A buffer air augmentation system for a gas turbine engine, the gas turbine engine having a compressor section and a turbine section engaged with one another by at least one shaft, a plurality of bearings supporting the shaft, and an engine compartment, the system comprising:

an air turbine starter (ATS) disposed to drive the compressor section and a turbine section, the air turbine starter configured to receive a flow of compressed air from a compressed air source, and the air turbine starter having an exhaust port through which a flow of ATS exhaust gas exits the air turbine starter; and flow ducting configured to selectively provide fluid communication between the exhaust port of the air turbine starter and the engine compartment, the flow ducting including a fluid flow control device configured to control the flow of ATS exhaust gas between the exhaust port of the air turbine starter and the engine compartment;

wherein the buffer air augmentation system is in communication with a controller, and the controller is in communication with the fluid flow control device and a non-transitory memory storing instructions, which instructions when executed cause the controller to control the fluid flow control device to control the flow of ATS exhaust gas between the exhaust port of the air turbine starter and the engine compartment until air within the engine compartment is at or above a predetermined air pressure value.

* * * * *